(12) United States Patent
Holm

(10) Patent No.: US 10,378,505 B2
(45) Date of Patent: Aug. 13, 2019

(54) HYDROKINETIC ENERGY CONVERSION SYSTEM AND USE THEREOF

(71) Applicant: Flumill AS, Arendal (NO)

(72) Inventor: Anders Holm, Arendal (NO)

(73) Assignee: Flumill AS, Arendal (NO)

( * ) Notice: Subject to any disclaimer, the term of this patent is extended or adjusted under 35 U.S.C. 154(b) by 488 days.

(21) Appl. No.: 15/127,795

(22) PCT Filed: Mar. 18, 2015

(86) PCT No.: PCT/EP2015/055678
§ 371 (c)(1),
(2) Date: Sep. 21, 2016

(87) PCT Pub. No.: WO2015/140209
PCT Pub. Date: Sep. 24, 2015

(65) Prior Publication Data
US 2017/0096981 A1    Apr. 6, 2017

(30) Foreign Application Priority Data
Mar. 21, 2014    (GB) .................................. 1405119.7

(51) Int. Cl.
*F03B 13/26*    (2006.01)
*F03B 17/06*    (2006.01)

(52) U.S. Cl.
CPC ............ *F03B 13/264* (2013.01); *F03B 17/06* (2013.01); *F05B 2240/243* (2013.01);
(Continued)

(58) Field of Classification Search
CPC ........ F03B 13/264; F03B 17/06; Y02E 10/28; F05B 2250/712; F05B 2250/25; F05B 2240/243; F05B 2250/711
See application file for complete search history.

(56) References Cited

U.S. PATENT DOCUMENTS 1,745,356 A * 2/1930 Crofton ................. F03B 17/063
416/123
4,500,259 A * 2/1985 Schumacher ......... F03B 17/063
416/122
(Continued)

FOREIGN PATENT DOCUMENTS

CH    700422    8/2010
FR    517707-X    5/1921
(Continued)

*Primary Examiner* — Carlos A Rivera
*Assistant Examiner* — Adam W Brown
(74) *Attorney, Agent, or Firm* — Christian D. Abel

(57) ABSTRACT

A hydrokinetic energy conversion system (1) comprising a turbine device (2) comprising a rotor (3) displaying a rotational axis (O), which turbine device is arranged to operate with the rotational axis in an inclined orientation vis-à-vis an incoming body of water (W), and which rotor comprises a blade (10) which is arranged to interact with the incoming body of water such that rotational energy is imparted to the rotor. The blade comprises a first, convex surface (12), a second, concave surface (13) and a free, distal edge (E) where the first surface and the second surface meet. The curvature of the second surface, when viewed in a plane orthogonal to the rotational axis, is such that a maximum depth (Dmax) of the second surface, when measured from a straight line intersecting the rotational axis and the distal edge, is at least 35% of the distance between the rotational axis and the distal edge.

16 Claims, 5 Drawing Sheets

(52) U.S. Cl.
CPC ..... *F05B 2250/25* (2013.01); *F05B 2250/711* (2013.01); *F05B 2250/712* (2013.01); *Y02E 10/28* (2013.01)

(56) References Cited

U.S. PATENT DOCUMENTS

| | | | | |
|---|---|---|---|---|
| 5,997,242 | A * | 12/1999 | Hecker | F03B 3/12 415/219.1 |
| 7,600,975 | B2 * | 10/2009 | Lotrionte | F03B 3/04 416/223 R |
| 7,633,174 | B1 | 12/2009 | Feiler | |
| 8,961,131 | B2 * | 2/2015 | Trayner | F03B 17/06 290/42 |
| 9,279,407 | B2 * | 3/2016 | Sinclaire | E02B 9/08 |
| 2006/0257241 | A1 | 11/2006 | Eielsen | |
| 2009/0214339 | A1 * | 8/2009 | Poleacov | F03B 3/121 416/1 |
| 2011/0206526 | A1 * | 8/2011 | Roberts | F03D 3/02 416/223 R |
| 2012/0128500 | A1 * | 5/2012 | Perless | F03D 3/061 416/223 R |
| 2013/0147199 | A1 | 6/2013 | Zambrano | |
| 2015/0063910 | A1 * | 3/2015 | Meltsov | F03B 13/1815 405/21 |

FOREIGN PATENT DOCUMENTS

| | | |
|---|---|---|
| JP | 2006516698 | 7/2006 |
| JP | 2011529151 | 12/2011 |
| WO | WO 2004/067957 A | 8/2004 |
| WO | 2010/011370 | 1/2010 |
| WO | WO 2013/006061 Y | 1/2013 |

* cited by examiner

HYDROKINETIC ENERGY CONVERSION SYSTEM AND USE THEREOF

FIELD OF THE INVENTION

The present invention relates to a hydrokinetic energy conversion system, i.e. a system for extracting energy from a flowing liquid. The flowing liquid may be flowing water, e.g. sea water (for instance, a tidal flow or an oceanic current) or fresh water (for instance, water flowing in a river). The flowing liquid may alternatively be flowing brackish water, flowing waste water or any other liquid which holds kinetic energy which shall be extracted/exploited.

In particular, the present invention relates to a hydrokinetic energy conversion system comprising a turbine device comprising a rotor displaying a rotational axis, which turbine device is arranged to operate with the rotational axis in an inclined orientation vis-à-vis an incoming body of water, and which rotor comprises at least one helical blade which is arranged to interact with the incoming body of water such that rotational energy is imparted to the rotor, which at least one helical blade comprises a first, convex surface, a second, concave surface and a free, distal edge where the first surface and the second surface meet.

The present invention also relates to use of such a system to extract energy from any one of a tidal flow, an ocean current and a river.

BACKGROUND

The present invention relates to a hydrokinetic energy conversion system where the turbine device of the system displays inclined orientation vis-à-vis the incoming body of water. Examples of such systems are disclosed in WO 2013/006061 A1, which is hereby incorporated by reference.

As compared to cross-flow turbines, which have a rotor axis that is orthogonal to the incoming water stream, and axial flow turbines, which have a rotor axis which operates in a plane which is parallel to the incoming water stream, an inclined turbine is arranged to operate with the rotational axis of the rotor in an inclined orientation vis-à-vis the incoming body of water. In such an inclined turbine, the geometry of the rotor will have a large impact on the energy conversion efficiency of the system, and finding an efficient blade geometry has proven to be difficult. The present invention addresses this problem and seeks to present a blade geometry which is particularly well adapted to systems in which the rotational axis of the rotor operates in an inclined orientation vis-à-vis the incoming body of water.

Consequently, according to one aspect, the object of the invention is to bring forth a hydrokinetic energy conversion system comprising an inclined flow hydrokinetic turbine having improved energy conversion efficiency as compared to prior art inclined flow turbines.

SUMMARY OF THE INVENTION

The system according to the invention is characterised in that the curvature of the second surface, when viewed in a plane orthogonal to the rotational axis, is such that a maximum depth of the second surface, when measured from a straight line intersecting the rotational axis and the distal edge, is at least 35%, more preferably at least 40% and most preferably at least 50% of the distance between the rotational axis and the distal edge.

It may be advantageous to also arrange the thickness of the at least one blade such that the at least one helical blade, at the position of the maximum depth, displays a thickness which is less than 15%, and more preferably less than 10% of the distance between the rotational axis and the distal edge.

The cross-section of the second surface, when viewed in a plane orthogonal to the rotational axis, may advantageously display a constant curvature between the position of the maximum depth and the distal edge.

The at least one helical blade may advantageously display a continuously decreasing thickness from the position of the maximum depth to the distal edge.

The at least one helical blade may advantageously display a pitch ratio which is within the interval of 1-4.

The rotor may advantageously display a diameter-length ratio which is within the interval of 0.1-0.7.

Said at least one helical blade may advantageously comprise a first helical blade and a second helical blade which is offset 180 degrees in relation to the first helical blade. The second helical blade may advantageously be identical to the first helical blade.

The rotor may alternatively have three, four or even more blades, which advantageously are distributed evenly in the rotational direction of the rotor.

The system may advantageously comprise a support device for supporting the turbine device, and the turbine device may advantageously comprise a first, proximal end and a second, distal end, which proximal end is pivotally connected to the support device about a pivot axis. The pivot axis may advantageously be orthogonal to the rotational axis. The pivot axis may advantageously have an orientation which is any one of horizontal, vertical and diagonal.

Alternatively, the system may advantageously comprise a first support device for supporting a first end and a second support device for supporting a second end of the turbine device, which first and second ends are fixedly connected to the support devices.

It may be advantageous to arrange the system such that the rotational axis, when the system is in operation, forms an angle to the incoming body of water which is within the interval of 80-20 degrees, more preferably 70-30 degrees, and most preferably 60-40 degrees.

During operation of the system, the rotor is advantageously submerged in the incoming body of water.

DESCRIPTION OF THE DRAWINGS

In the following, the invention will be described in more detail with reference to the attached drawings.

DETAILED DESCRIPTION OF THE INVENTION

Figure 1:
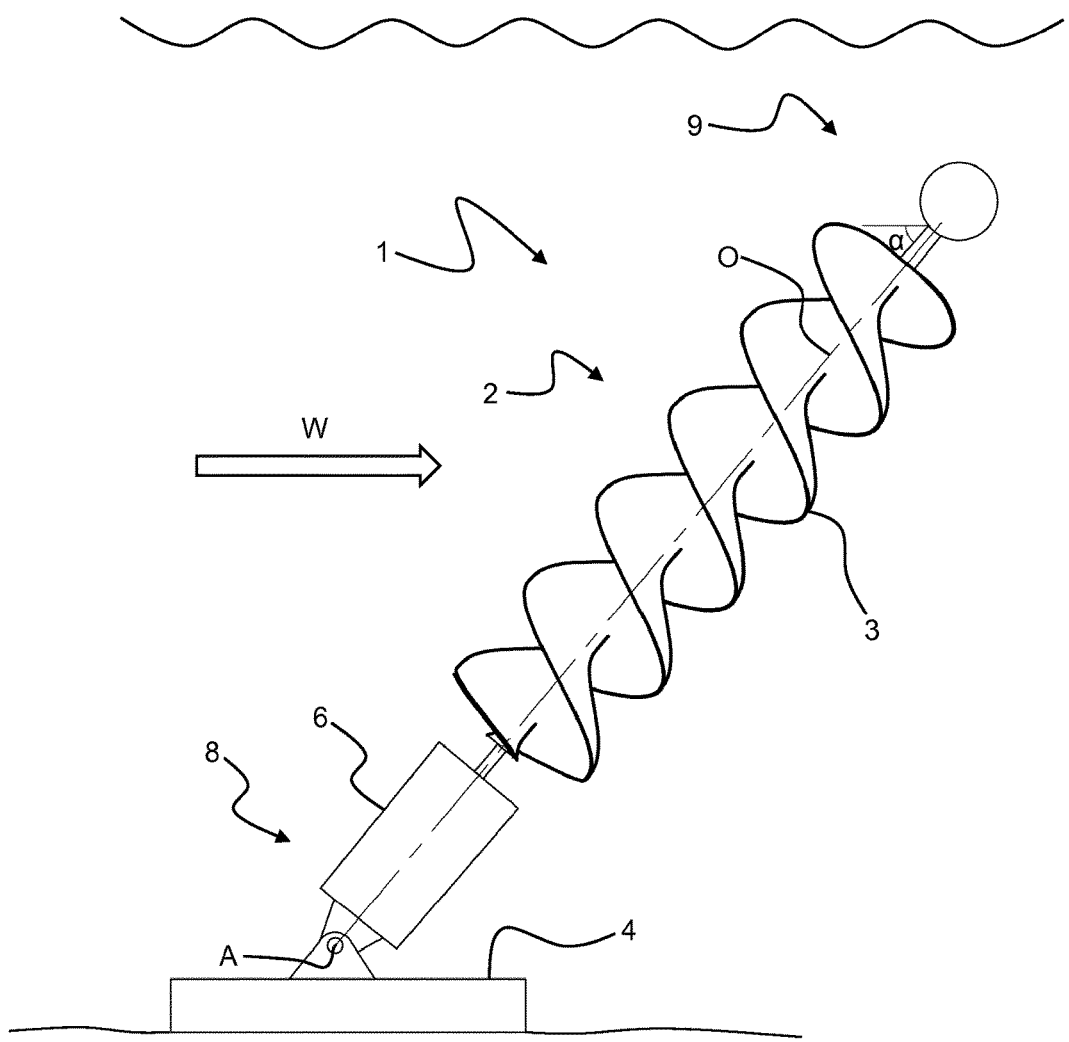
FIG. 1 is a schematic side view of a tidal driven hydrokinetic conversion system according to one embodiment of the invention.

FIG. 1 discloses a side view of a first embodiment of a hydrokinetic conversion system 1 according to the invention. The system 1 comprises a turbine device 2 which comprises a first, proximate end 8 and a second, distal end 9. The turbine device 2 further comprises a helical rotor 3 which is mounted on a support device 4. The rotor 3 comprises a rotational axis O. During operation of the system, the axis O has an inclined orientation vis-à-vis an incoming body of water W, as is disclosed in FIG. 1. During operation, the rotor is submerged in the incoming body of water W, which will bring the rotor 3 to rotate about its axis O such that rotational energy is enforced upon the rotor 3.

The rotor 3 is connected to an energy converter 6, which may be an electrical generator. In alternative embodiments, the energy converters 6 may be pumps, e.g. for providing pressurized air. Generally speaking, the energy converters 6 may be any type of energy converting device which converts the rotational energy of the rotor, which in turn is provided by the kinetic energy of the flowing water W, into a different form of energy.

The rotational axis O may form an angle α to the incoming body of water which is within the interval of 80-20 degrees. More preferably, however, the angle α is within the interval of 70-30 degrees, and most preferably within the interval of 60-40 degrees, e.g. 50 degrees.

The turbine device 2 is pivotally mounted in the support device 4 about a pivot axis A such that the angle α can be adjusted to the incoming body of water W. The pivot axis A is orthogonal to the rotational axis O. This configuration is particularly advantageous in a system for extracting energy from a tidal flow, as it allows the turbine device 2 to rotate in a plane orthogonal to the pivot axis A to adjust to a change in velocity and direction of the incoming body of water, e.g. caused by changing tide, as is disclosed in FIG. 2. In such a configuration, it may be advantageous to arrange the rotor 3 such that it has a density which is less than the surrounding body of water W such that the turbine device 2 assumes the correct angle α vis-à-vis the incoming body of water W at all times, e.g. to adjust to different velocities of the incoming body of water. Alternatively or additionally, it may be advantageous to arrange a buoyancy device or hydrofoil 17 at the distal end 9 of the turbine device 2. Such a buoyancy device is disclosed in the above-mentioned document WO 2013/006061 A1. By arranging the rotor 3 such that it has a density which is less than the surrounding body of water W and/or arranging a buoyancy device or hydrofoil 17 at the distal end 9 of the turbine device 2, the device 2 can be configured to operate with the angle α being within a predetermined interval, e.g. 60-40 degrees, depending on the characteristics and velocity of the incoming body of water. However, at switching tides the system may start to produce energy already at angles α slightly less than 90 degrees, e.g. at 85 or 80 degrees.

Figure 2:
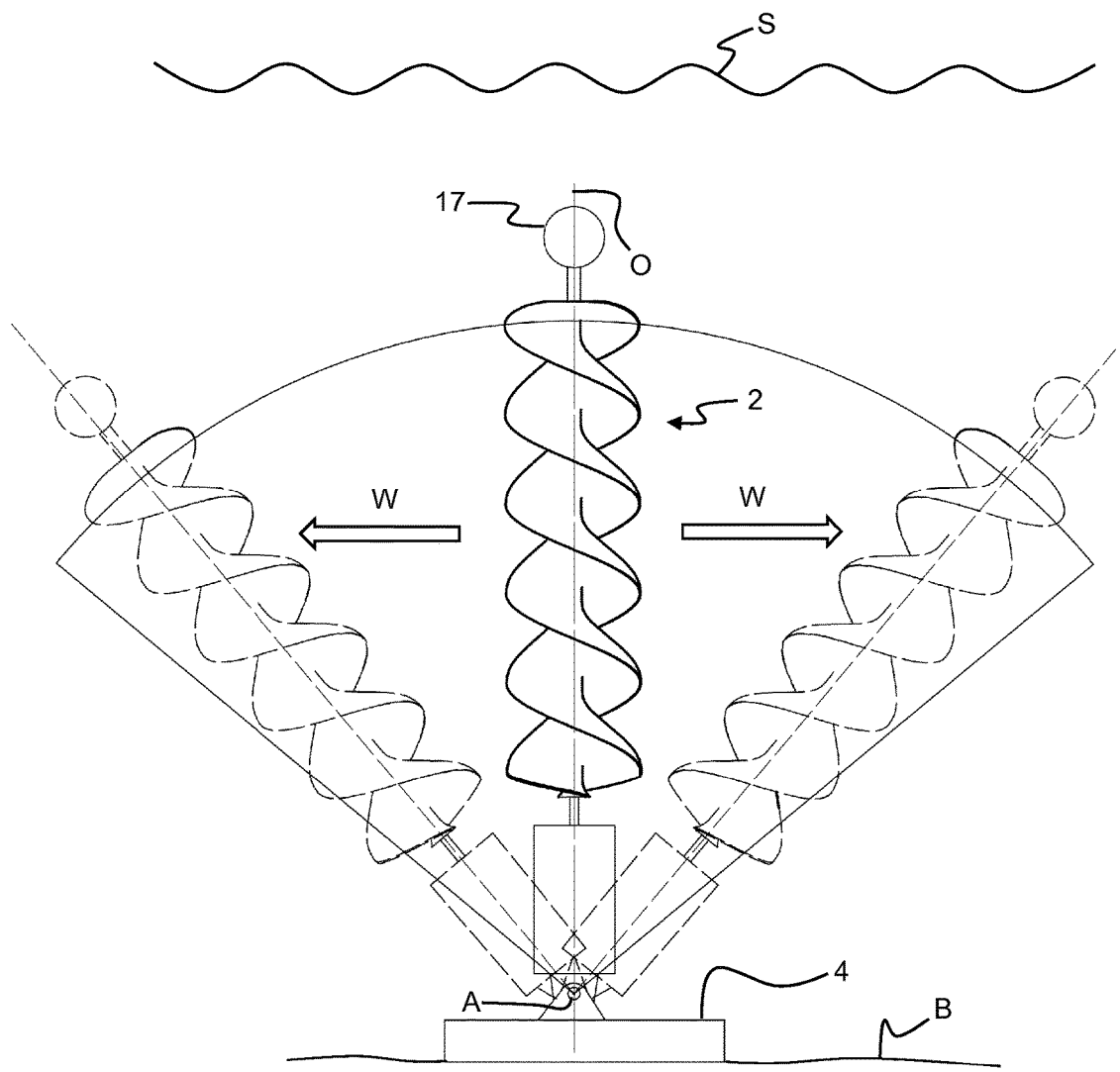
FIG. 2 is a side view of the system according to FIG. 1 in different operation positions.

In the embodiment disclosed in FIGS. 1 and 2, the pivot axis A is horizontal, or at least substantially horizontal. However, the pivot axis A may alternatively be vertical, or at least substantially vertical, or it may be diagonal.

In the embodiment disclosed in FIGS. 1 and 2, the support device 4 is situated at the bottom B of the body of water W. Alternatively, however, the support device 4 may be situated at the surface S of the body of water W, or even outside of the body of water, e.g. on a structure bridging a narrow straight, as long as the support structure 4 allows the rotor 3 to be submerged in the incoming body of water W.

Figure 3:
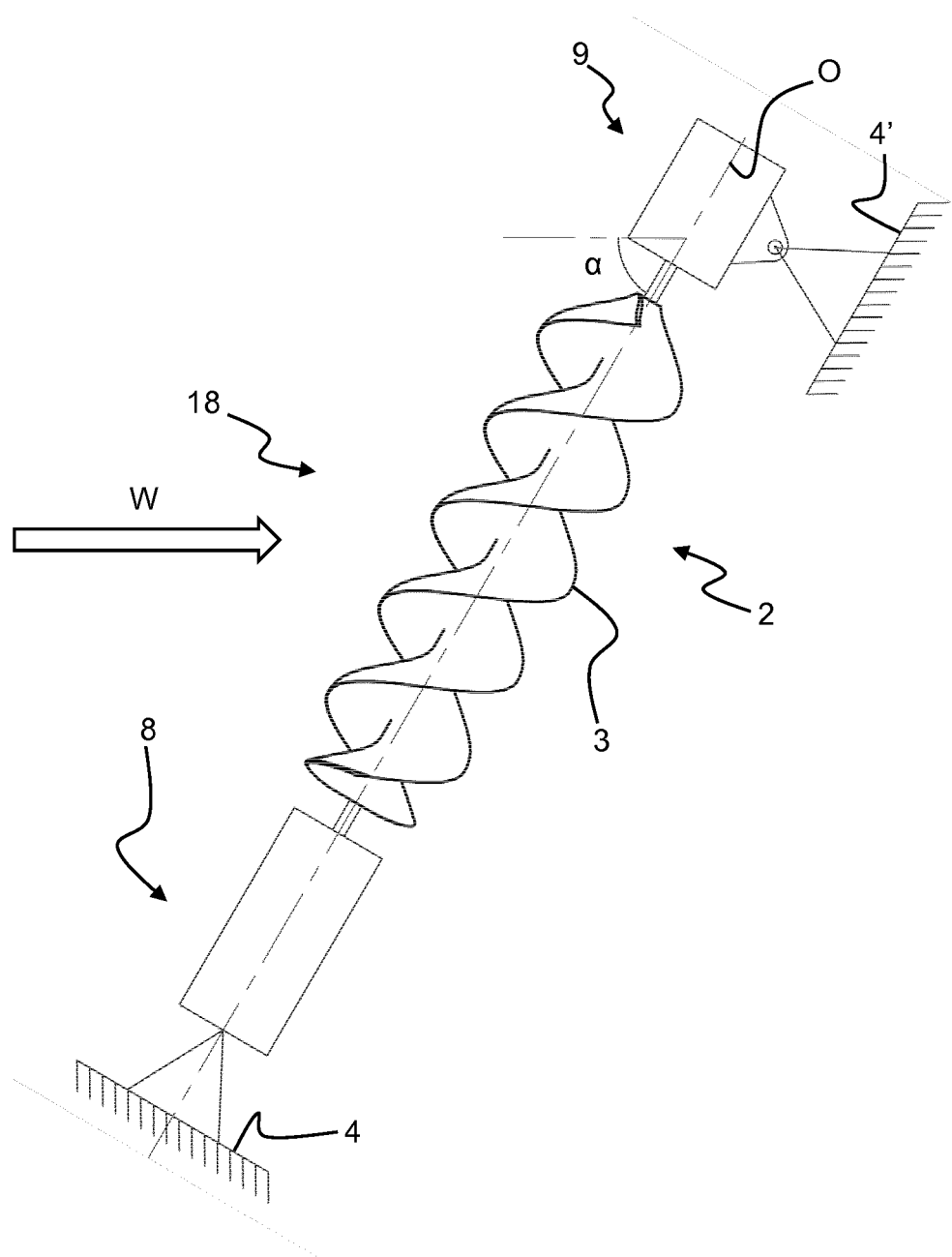
FIG. 3 is a schematic top view of a river based hydrokinetic conversion system according to one embodiment of the invention.

FIG. 3 discloses a top view of second embodiment of a hydrokinetic conversion system 18 according to the invention. In this embodiment, also the second end 9 of the turbine device 2 is fixedly mounted in a support device 4'. This configuration may be advantageous when the system is mounted in a river, in which case the direction of the incoming body of water is generally constant. The support devices 4, 4' thus allows the turbine device 2 to maintain a fixed angle α vis-à-vis the incoming body of water W. When arranged in a river, the system may advantageously be positioned such that the rotational axis O is generally parallel to the river bed.

The support structures 4, 4' may advantageously be positioned on the river bed. However, they may alternatively be positioned on the river bank or on a structure bridging the river as long as the support structures 4, 4' allow the rotor 3 to be submerged in the incoming body of water W.

In the disclosed embodiments, the hydrokinetic conversion systems 1, 18 comprise one rotor 3 which is connected to the energy converter 6. In alternative embodiments, however, the hydrokinetic conversion system may comprise two, three, four or any other number of rotors. Also, the rotors may be connected to a common energy converter, or connected to energy converters in groups such that two or more rotors are connected to the same energy converter.

Figure 4:
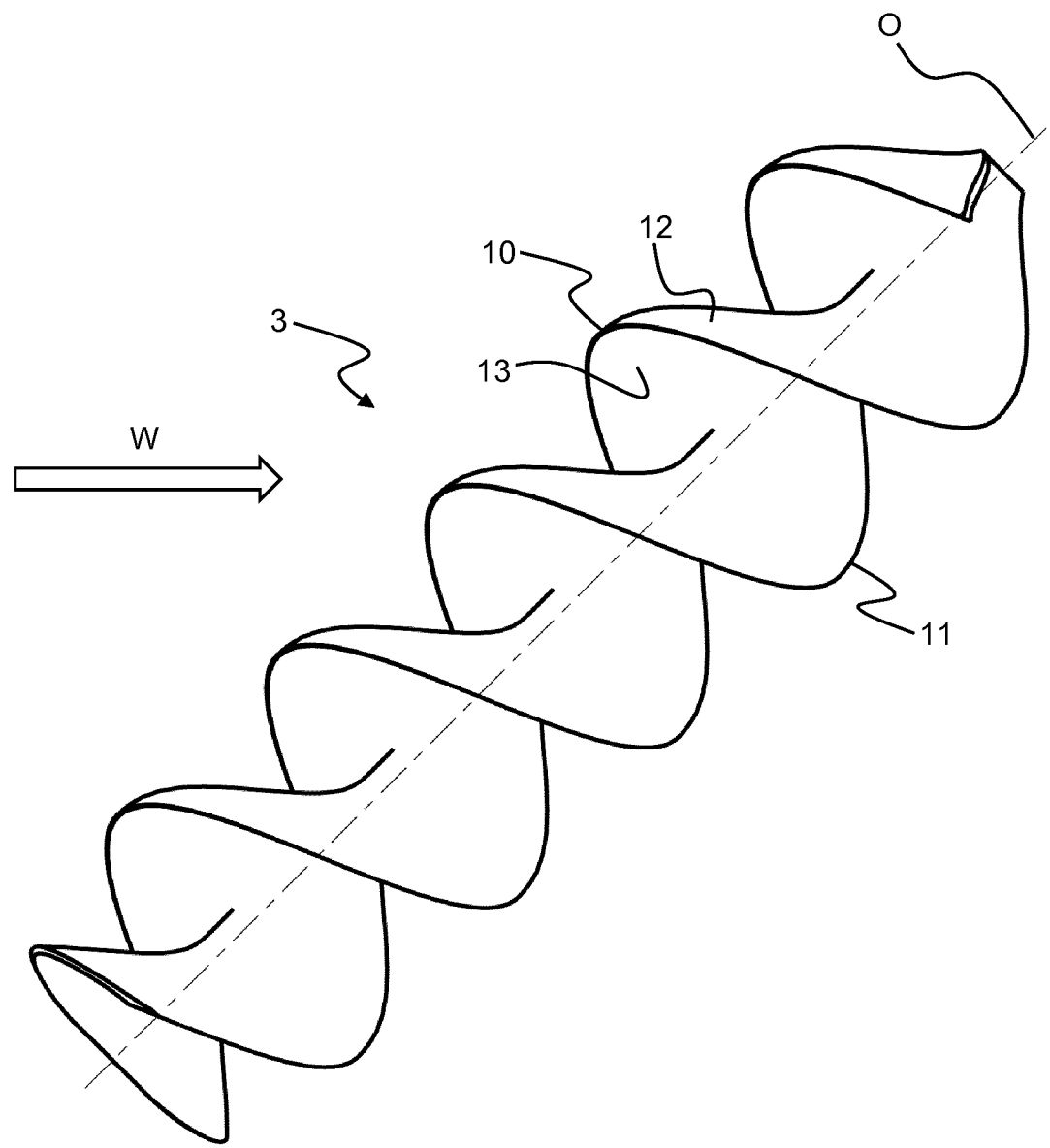
FIG. 4 is a perspective drawing of an embodiment of a rotor of the hydrokinetic conversion system according to the invention.
Figure 5:
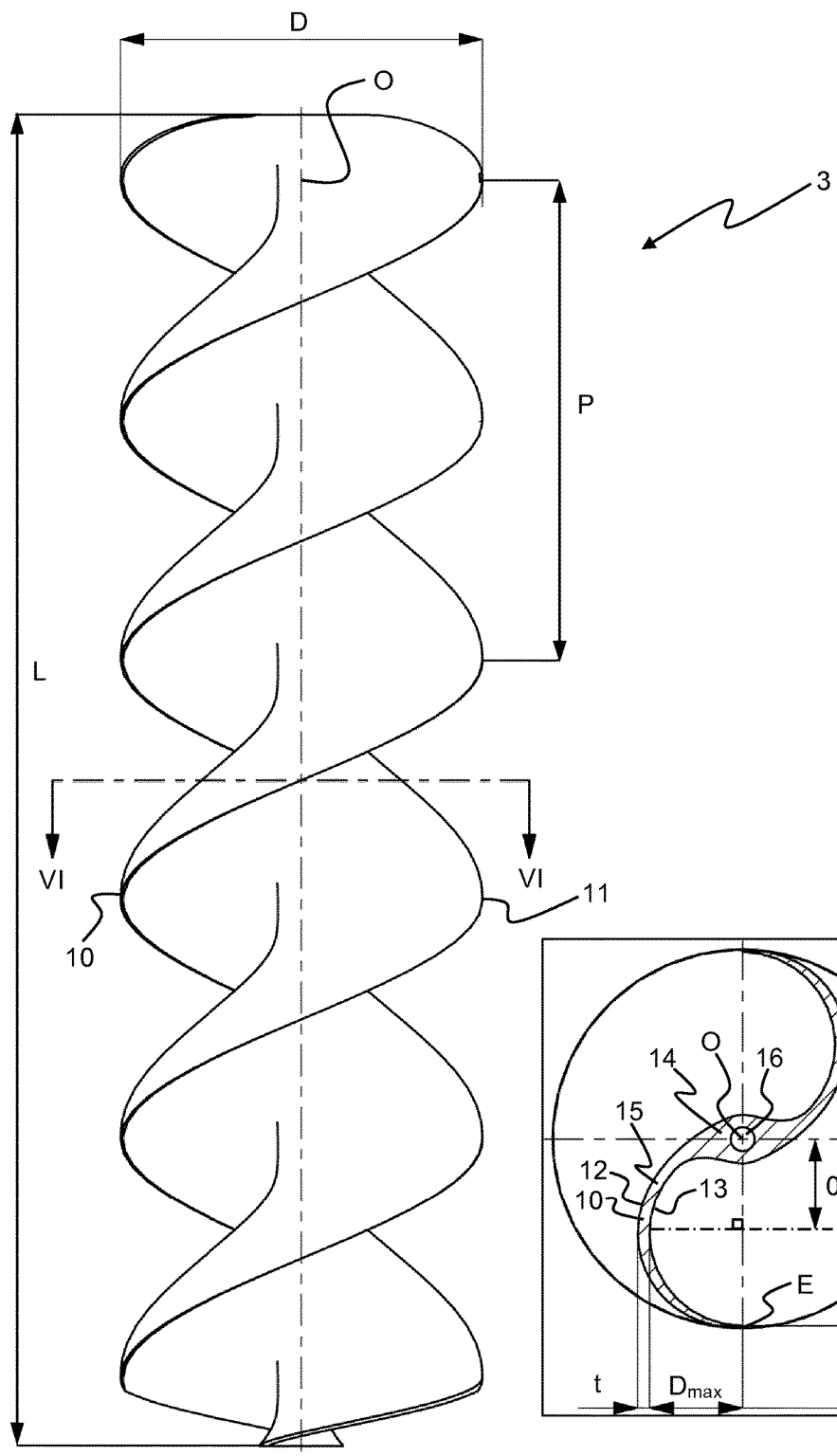
FIG. 5 is a side view of the rotor according to FIG. 4.
Figure 6:
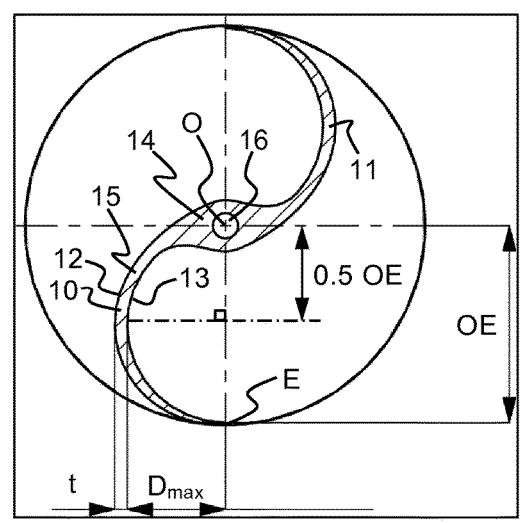
FIG. 6 is a sectional view of the rotor along the section marked VI-VI in FIG. 5.

FIGS. 4-6 disclose an embodiment of the helical rotor 3 of the hydrokinetic energy system according to the invention. The rotor 3 comprises first 10 and second 11 helical blades which are identical to each other but offset 180 degrees (cf. FIG. 6). Each helical blade 10, 11 comprise a first, convex surface 12 and a second, concave surface 13. The first surface 12 forms a low pressure surface and the second surface 13 forms a high pressure surface. Each helical blade 10, 11 also comprise a free, distal edge E (cf. FIG. 6) where the first surface 12 and the second surface 13 meet. The distal edge E defines, or sweeps, the outer diameter D of the rotor 3.

The curvature of the second surface 13, when viewed in a plane orthogonal to the rotational axis O, is such that a maximum depth $D_{max}$ of the second surface 13, when measured from a straight line intersecting the rotational axis O and the distal edge E, is approximately 49% of the distance OE between the rotational axis O and the distal edge E. At the position of the maximum depth, the blade has a thickness t which is approximately 9% of the distance OE between the rotational axis O and the distal edge E.

The cross-section of the second surface 13, when viewed in a plane orthogonal to the rotational axis O, has a constant curvature between the position of the maximum depth $D_{max}$ and the distal edge E, and the blade 10 has a continuously decreasing thickness from the position of the maximum depth $D_{max}$ to the distal edge E.

In the disclosed embodiment, the maximum depth is located at a position which is approximately halfway between the rotational axis O and the distal edge E, i.e. at 0.5 OE. However, the maximum depth may be located at a position which is closer to the rotational axis O, e.g. within 0.3-0.5 OE, or closer to the distal edge, e.g. within 0.5-0.8 OE.

The rotor 3 comprises an inner, central section 14, which extends from the axis O to approximately one quarter of the radius of the rotor 3, and an outer section 15, which extends from the inner section 14 to the radius of the distal edge E. The inner section 14 displays an increased thickness to accommodate a longitudinal axle 16. In the outer section 15, the surfaces 12 and 13 have a generally constant curvature and are slowly converging to meet at the distal edge E.

Each blade 10, 11 displays a pitch ratio, P/D, which is approximately 1.4, where the pitch ratio is defined as the ration between the pitch P of the blade 10, 11 and the diameter D of the rotor 3. The pitch, P, is defined as the length of one full twist or turn of the blade 10, 11 (cf. FIG. 5).

The rotor 3 displays a diameter-length ratio, D/L, which is approximately 0.3.

For the embodiment above, values for the parameters D/L and P/D have been given for a specific embodiment. It is understood, however, that theses parameters need to be adjusted to the operational site of the system, taking into account, inter alia, the depth and the prevailing velocity of the body of water in which the system is to operate.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

The invention claimed is:

1. A hydrokinetic energy conversion system comprising a turbine device comprising a rotor displaying a rotational axis, which turbine device is arranged to operate with the rotational axis in an inclined orientation vis-à-vis an incoming body of water, and which rotor comprises at least one helical blade which is arranged to interact with the incoming body of water such that rotational energy is imparted to the rotor, which at least one helical blade comprises a first, convex surface, a second, concave surface and a free, distal edge where the first surface and the second surface meet, wherein the curvature of the second surface, when viewed in a plane orthogonal to the rotational axis, is such that a maximum depth of the second surface, when measured from a straight line intersecting the rotational axis and the distal edge, is at least 35% of the distance between the rotational axis and the distal edge and in that the at least one helical blade, at the position of the maximum depth, displays a thickness which is less than 15% of the distance between the rotational axis and the distal edge.

2. The system according to claim 1, wherein said maximum depth is at least 40% of the distance between the rotational axis and the distal edge.

3. The system according to claim 2, wherein said maximum depth is at least 50% of the distance between the rotational axis and the distal edge.

4. The system according to claim 1, wherein the at least one helical blade, at the position of the maximum depth ($D_{max}$), displays a thickness which is less than 10% of the distance between the rotational axis and the distal edge.

5. The system according to claim 1 wherein a cross-section of the second surface, when viewed in a plane orthogonal to the rotational axis, displays a constant curvature between the position of the maximum depth and the distal edge.

6. The system according to claim 1, wherein the at least one helical blade displays a continuously decreasing thickness from the position of the maximum depth to the distal edge.

7. The system according to claim 1, wherein the at least one helical blade displays a pitch ratio within the interval of 1-4.

8. The system according to claim 1, wherein the rotor displays a diameter-length ratio within the interval of 0.1-1.7.

9. The system according to claim 1, wherein said at least one helical blade comprises a first helical blade and a second helical blade which is offset 180 degrees in relation to the first helical blade.

10. The system according to claim 1, wherein it comprises a support device for supporting the turbine device, and in that the turbine device comprises a first, proximal end and a second, distal end, which proximal end is pivotally connected to the support device about a pivot axis.

11. The system according to claim 10, wherein the pivot axis is orthogonal to the rotational axis.

12. The system according to claim 11, wherein the pivot axis has an orientation which is any one of horizontal, vertical and diagonal.

13. The system according to any one of claims 1-9, wherein it comprises a first support device for supporting a first end (8) and a second support device for supporting a second end of the turbine device, which first and second ends are fixedly connected to the support devices.

14. The system according to claim 1, wherein the rotational axis, when the system is in operation, forms an angle (α) to the incoming body of water which is within the interval of 80-20 degrees.

15. The system according to claim 14, wherein the rotational axis, when the system is in operation, forms an angle (α) to the incoming body of water which is within the interval of 70-30 degrees.

16. The system according to claim 15, wherein the rotational axis, when the system is in operation, forms an angle (α) to the incoming body of water which is within the interval of 60-40 degrees.

\* \* \* \* \*